(No Model.)

W. H. PRESSER.
PROCESS OF EQUALIZING THE TENSION IN CIRCULAR SAWS.

No. 316,659. Patented Apr. 28, 1885.

Attest:
John Schumann.
N. J. Sprague

Inventor:
Wm. H. Presser.
by his Att'y
Thos. S. Sprague

UNITED STATES PATENT OFFICE.

WILLIAM H. PRESSER, OF EAST SAGINAW, MICHIGAN.

PROCESS OF EQUALIZING THE TENSION IN CIRCULAR SAWS.

SPECIFICATION forming part of Letters Patent No. 316,659, dated April 28, 1885.

Application filed October 10, 1884. (No model.)

*To all whom it may concern:*

Be it known that I, WILLIAM H. PRESSER, of East Saginaw, in the county of Saginaw and State of Michigan, have invented new and useful Improvements in Process of Equalizing the Tension Upon Circular Saws; and I do hereby declare that the following is a full, clear, and exact description thereof, reference being had to the accompanying drawings, which form a part of this specification.

This invention relates to certain new and useful improvements in the process of securing an equal tension upon circular saws. At the present state of the art one way of adjusting the tension of a circular saw, so that it will run in operation in a true plane and not buckle, is by hammering the saw between the center and its outer portion until it becomes "loose." This process of hammering requires very skillful treatment in order to relieve the tension in a uniform manner; but no matter how skillfully it is done it is injurious to the saw, as the material is thereby made coarse; and the object of my invention is to replace the process of hammering by another process which gives a superior result, does away with the use of skilled labor, and can be effected in less time. This process consists in stretching the saw by a certain application of heat instead of by mechanical force, as heretofore.

Figure 1:
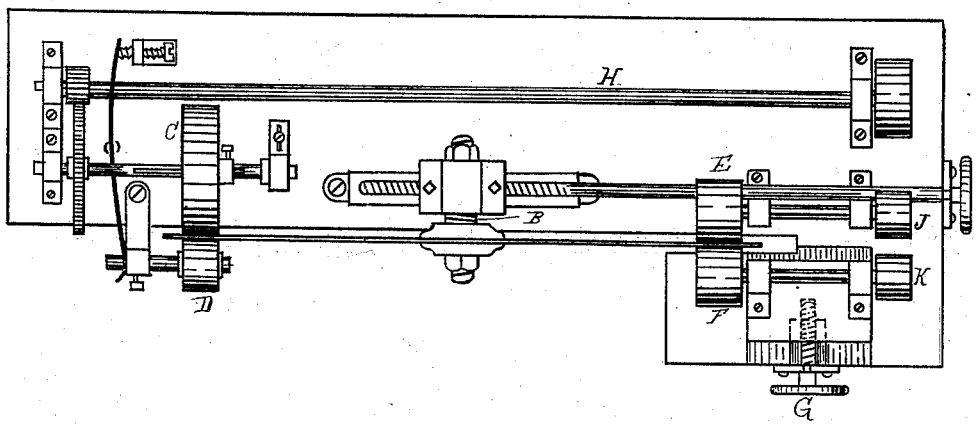
Figure 2:
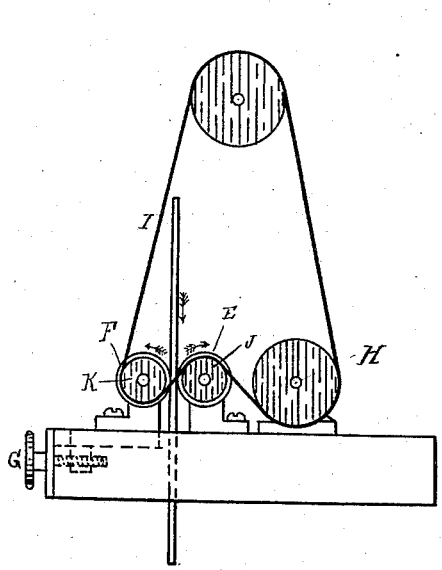
Figure 3:
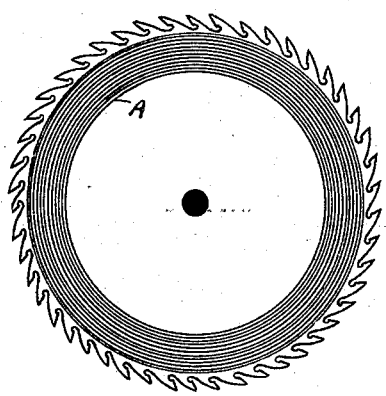

In the accompanying drawings, which form a part of this specification, Figure 1 is a plan view of a suitable machine by which I intend to carry out my process, and Fig. 2 is an end elevation thereof. Fig. 3 is a diagram of a saw-blade.

The process by which I effect the proper stretching of the saw-blade consists of heating the outer ring portion of the saw, while the inner portions of the saw are kept cool. It is evident that if the ring portion (marked A in Fig. 3) is heated, such heat will expand such ring portion and the force created by such expansion must necessarily stretch the saw-blade—that is, such portions lying inside of the heated ring—in a radial outward direction. If the saw is then cooled again, the compressive force of the cooling does not bring the expanded parts of the inner portion of the saw-blade into their original position, but pro- duces the same "looseness" of the saw-blade heretofore obtained by hammering.

In carrying out my process it is of course necessary to confine the heat applied only to the outer ring portion, and in such manner that the inlying portions remain cool. For this purpose I have constructed a machine in which the outer ring portion of the saw is quickly and evenly heated without the use of special means for preventing said heat to communicate to the inlying portion of the sawblade.

The construction of this machine is as follows: B is a saw-arbor, upon which the saw to be operated upon is secured. C is a friction-pulley by means of which motion is communicated to the saw so as to revolve it upon its arbor. D is a counter friction-pulley made adjustable by any suitable devices, so as to get the required friction upon the saw-blade to rotate it and overcome the friction applied to the saw at a different place. This latter friction is produced by the friction-pulleys E and F, which are driven by power in a direction opposite the one given to the saw-blade by the friction-pulley C. The friction-pulleys E F are of comparatively small diameter, and the width of their face corresponds to the width of the ring A, which it is desired to heat. One of the two pulleys E F is supplied with suitable devices—such as the set-screw G in the drawings—for adjusting the tension of the friction-pulleys E F against the saw-blade.

Motion may be given to the parts in any suitable manner.

In the drawings I show a counter-shaft, H, which receives its motion from any convenient source of power by means of a belt, I. This belt also passes over pulleys J and K, by means of which the friction-pulleys E F are given their proper motion. The counter-shaft H, by means of intermediate gear, communicates its motion to the friction-pulley C, which is of proper size, and exerts the necessary tension to revolve the saw upon its arbor against the opposing friction of the friction-pulleys E F.

In practice the saw is revolved upon its arbor with a comparatively slow motion, while the friction-pulleys D and F revolve rapidly in an opposite direction. Therefore, if the necessary tension is applied to these pulleys, so as to press against the ring portion A of the saw with which they come in contact, any desired amount of heat may be created by means of such friction.

I have found by experiment that with a machine constructed in the above-described manner a little more than one revolution of the saw is required to heat the ring portion A of the saw to the required degree, and uniformly so to effect the desired purpose.

For carrying out my process I do not desire to confine myself to any particular kind of apparatus, as it is evident that it may be carried out by simply applying the heat to the ring portion A of the saw-blade in any suitable manner; but I believe that the means herein described for carrying out my process allow of obtaining the desired result in a more superior manner.

I am aware of the Patent No. 237,915, and make no claim to anything shown therein as forming part of my invention.

What I claim as my invention is—

1. The herein-described process of stretching the central portions of a saw-blade by the application of heat to the outer ring portion of the saw, substantially as described.

2. The herein-described process of stretching the central portions of a circular-saw blade by creating a stretching force in the saw-blade between its inner and outer portions by the application of friction to the outer ring portion, while the inner portion is kept cool, substantially as described.

WM. H. PRESSER.

Witnesses:
H. S. SPRAGUE,
E. SCULLY.